Figure 5:
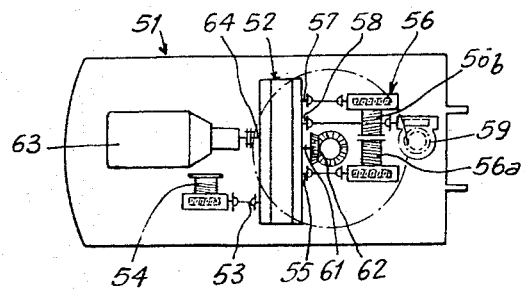

Nov. 22, 1966  A. HAULOTTE  3,286,852
GEAR BOX
Original Filed Nov. 21, 1960
2 Sheets-Sheet 1
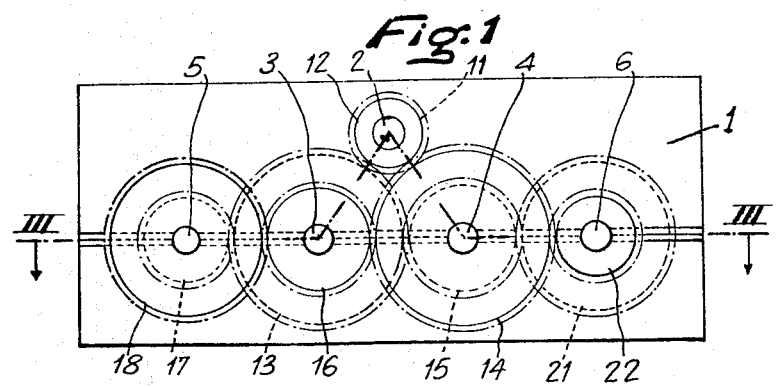
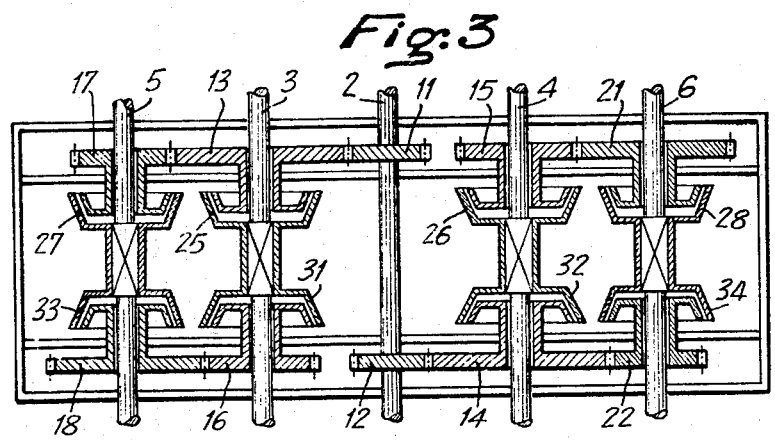
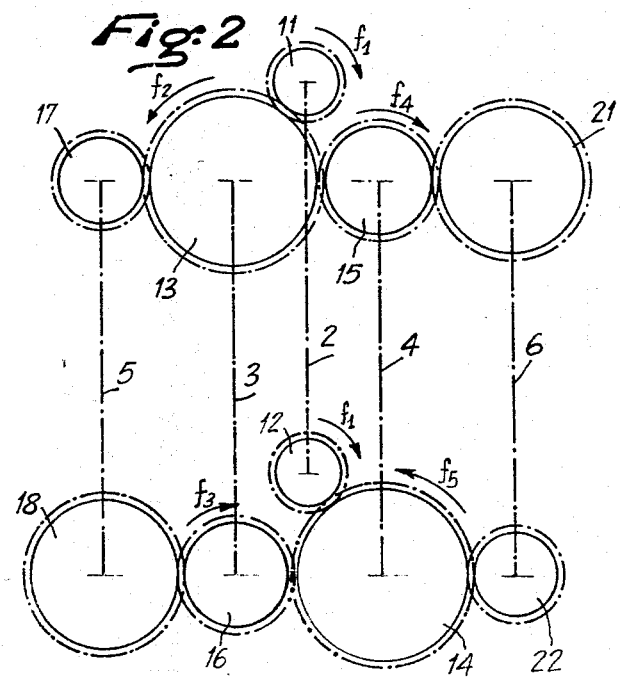

United States Patent Office 3,286,852
Patented Nov. 22, 1966

3,286,852
GEAR BOX
Arthur Haulotte, La Martiniere, Chambery,
Savoie, France
Continuation of application Ser. No. 70,730, Nov. 21,
1960. This application Dec. 5, 1963, Ser. No. 329,345
Claims priority, application France, Nov. 20, 1959,
810,784
2 Claims. (Cl. 212—38)

This invention relates to a gearbox of the "transfer" type which is particularly suitable for use in hoisting apparatus and, in a general way, wherever there is a need to effect rotary movements in both directions. This application is a continuation of my earlier application, Serial No. 70,730, filed November 21, 1960, now abandoned.

The gearbox according to the invention is characterized in that it comprises a primary shaft driven, in most cases, in a single direction and carrying two pinions which are each in engagement with a toothed wheel which is the first wheel of a respective gear train of idler wheels comprising at least two wheels, the uneven-number wheels of each train being mounted on the same output shafts as corresponding even-number wheels of the other train, and means being provided for drivably coupling each toothed wheel at will with the output shaft which carries it, in such a manner that according to whether an output shaft is coupled to one or other of the two wheel which it carries, the said shaft is driven from the primary shaft in one or other direction of rotation.

Owing to this very simple structure, it is possible to construct gearboxes comprising any number of output shafts which can each be driven selectively either in one direction or in the other, independently of the direction of rotation of the other shafts at the same time. This arrangement permits great diversity of movement, both in regard to the selection of the movements and to their directions, and all quite independently of the individual requirements of each movement.

In one particular form of embodiment, each gear train comprises toothed wheels on either side of the aforesaid first toothed wheel.

It is a particular object of the invention to utilize a gearbox to furnish a drive for a winch in opposite directions at prearranged different speeds to compensate for the momentum of the lowering of a load whereby the load will be raised and lowered at substantially the same speed.

It is a further object to utilize the gearbox with a "two drum" winch such that each of the drums can be independently driven as above to raise and lower the load associated therewith at substantially a constant speed.

Figure 6:
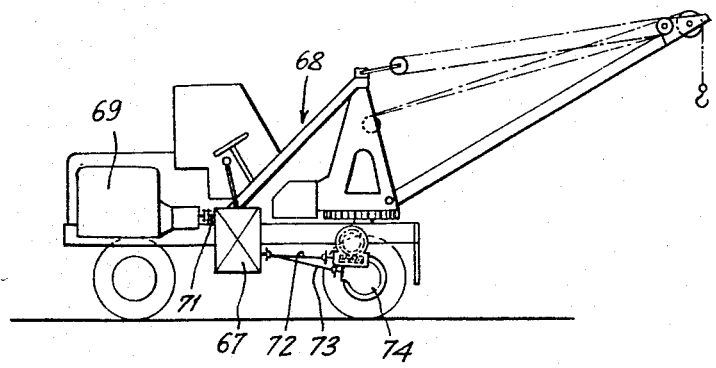
Figure 4:
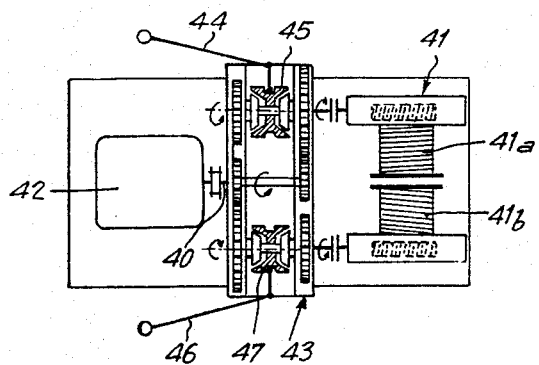

The invention will be better understood from the following description and the accompanying drawings which show, by way of non-limitative example, one embodiment of the invention and several applications thereof. In these drawings:

FIGURE 1 is a diagrammatic elevation view of a transfer box according to the invention, with four output shafts;

FIGURE 2 diagrammatically illustrates the coupling of the gear trains of the gearbox;

FIGURE 3 is a diagrammatic developed section on the broken line III—III of FIG. 1; and FIGURES 4 to 6 illustrate diagrammatically applications of the gearbox according to the invention, in a two-drum winch, a rotary crane platform, and a self-propelled mobile crane respectively.

The gearbox of the "transfer" type shown in FIGS. 1–3 comprises a casing 1 which is in two parts, in which are journalled a primary shaft 2 and four output shafts 3, 4, 5 and 6. All these shafts are parallel and the primary shaft 2 is always driven in the same direction (indicated by the arrow $f_1$ in FIG. 2).

Two pinions 11 and 12, attached to the primary shaft 2, mesh respectively with two toothed wheels 13, 14, which are idlers on the shafts 3 and 4 respectively.

Two other toothed wheels 15, 16, which mesh respectively with the toothed wheels 13 and 14, are freely mounted on the shafts 4 and 3 respectively.

Two toothed wheels 17, 18, which are respectively in mesh with the toothed wheels 13 and 16, are also mounted freely on the shaft 5, and on the shaft 6 there are mounted two free toothed wheels 21, 22, which mesh respectively with the toothed wheels 15 and 14.

Mounted on the output shafts 3, 4, 5 and 6 are clutches 25, 26, 27 and 28 respectively, of the conical-member type, adapted to selectively couple the output shafts 3, 4, 5 and 6 with the toothed wheels 13, 15, 17 and 21 respectively.

In a similar manner, the same output shafts carry clutches 31, 32, 33 and 34 which make it possible to selectively couple the said shafts with the toothed wheels 16, 14, 18 and 22 respectively.

When the primary shaft 2 is driven in the direction of the arrow $f_1$, the toothed wheel 13 in mesh with the pinion 11 of the said primary shaft and arranged freely on the output shaft 3, rotates in the direction of the arrow $f_2$, while the toothed wheel 16, meshing with the toothed wheel 14 which itself meshes with the pinion 12 carried by the primary shaft 2, rotates in the direction of the arrow $f_3$, so that these two toothed wheels 13 and 16, mounted freely on the same output shaft 3, rotate in opposite directions.

It will be clear that according to whether the clutch 25 or the clutch 31 is engaged, the output shaft 3 is driven by the wheel 13 or the wheel 16 and that, consequently, the said shaft rotates either in the direction of the arrow $f_2$ or in the direction of the arrow $f_3$.

Similarly, according to whether the clutch 26 or the clutch 32 is engaged, it is possible optionally to rotate the output shaft 4 either in the direction of the arrow $f_4$ or in the opposite direction as indicated by the arrow $f_5$, which are the corresponding directions of rotation of the toothed wheels 15 and 14.

The same applies to the two other output shafts 5 and 6, which can be made to rotate either in one direction or in the other, depending on whether the clutches 25 or 31 and 28 or 34 respectively are engaged.

It will be noted, and this is very important, that the arrangement which has just been described makes it possible at will to rotate a single output shaft or several output shafts simultaneously, in either one of the two directions of rotation, individually for each shaft, irrespective of the directions of rotation of the other shafts.

In the arrangement illustrated, where all the shafts are parallel and wherein the pinions 11 and 12, carried by the primary shaft 2, are identical, the toothed wheels which are mounted on the two ends of any of the output shafts are of different diameters, so that the gears do not impede one another. This is very advantageous, more particularly in hoisting apparatus, for example, where it is possible, for example, to use a low speed drive from one of the output shafts for lowering the load, while the high-speed drive of the same shaft is used in order to raise the load, since when the load descends it acquires motive force or momentum and, consequently, tends to drive the shaft which controls it at a higher speed than the speed at which the shaft is driven when it is raising the load. In this way it is possible to insure that the speed at which a load is lowered is substantially equal to its hoisting speed.

In FIG. 4 there is shown an example wherein a gearbox of the kind described hereinbefore is used for the control of a winch 41 which is adapted to operate in two directions and comprises two drums 41a and 41b. The motor 42 drives the input shaft 40 of the gearbox 43, which is provided with two control levers 44 and 46 which control two clutches 45 and 47 intended for driving the drum 41a and the drum 41b respectively in one direction or in the other. Thus, the two drums can be driven in desired directions independently of one another.

FIG. 5 shows a rotating platform 51 of a crane, which comprises a gearbox 52 according to the invention, having five output shafts, comprising a shaft 53 for controlling a jib winch 54, a shaft 55 for controlling one of the drums 56a of a hoisting winch 56, a shaft 57 for controlling the second drum 56b of the hoisting winch 56, a shaft 58 for controlling the orientation of the platform by means of a reduction gear 59, and finally a shaft 61 for controlling the translational movement of the platform by means of a pair of bevel gears 62. A motor 63 is connected to the input shaft 64 of the gearbox 52. By means of a clutch with which each output shaft of the box is provided, each of the aforesaid parts can be controlled individually in the desired direction, with two or more of the movements in question occurring simultaneously if desired.

FIG. 6 shows a gearbox 67, according to the invention which is mounted on a mobile crane 68. The motor 69 of the crane drives the input shaft 71 of the transfer box, while the output shafts such as 72 and 73, make it possible to drive the hoisting and jib winches and also the axle 74 of the vehicle. Here again the movements can be effected individually or simultaneously and each in the desired direction, independently of the direction of the other movements.

The clutches of the conical-member type shown diagrammatically in FIG. 3 could be replaced by clutches of any other suitable conventional type, for example, multiple-disc clutches, dog clutches, and electromagnetic clutches.

A gearbox could be provided with a number of output shafts other than four as illustrated in the drawings, for example, only with the two shafts 3 and 4, or else, on the contrary, with a larger number of output shafts than four.

Instead of distributing the gear trains on each side of the two output shafts which have a toothed wheel meshing with a pinion of the primary shaft, all the toothed wheels in each of the gear trains could be situated on a single side of the two toothed wheels in question.

The geometric axes of all the output shafts, instead of being arranged in one and the same plane, could be situated in different planes, for example, along generatrices of a cylindrical surface if desired.

Instead of providing on each of the output shafts toothed wheels such that the rotational speed of one shaft is different, depending on whether it is rotated in one direction or in the other, combinations of toothed wheels could be provided, more particularly by means of helical gear wheels carried by parallel shafts, thus obtaining equal rotational speeds in both directions.

Finally, instead of providing a primary shaft which always rotates in the same direction, a gearbox could be constructed wherein the primary shaft would turn optionally in one direction or in the other, which would make it possible for each direction of rotation, with the arrangement described, to rotate the output shafts at the same speed in both directions if this were desired.

What is claimed is:

1. Hoisting apparatus comprising a vehicle, wheels supporting said vehicle, a platform rotatably mounted on said vehicle, a jib having a lower end pivoted on said platform, a jib winch, a hoisting winch, power means for driving said jib winch, said hoisting winch, said rotatable platform, and said wheels, and gearbox means independently connecting said power means to said jib winch, hoisting winch, rotatable platform, and wheels, for movement thereof in any of two directions, said gearbox means comprising: an input shaft, a pair of pinion gears of the same size supported on said input shaft for rotation therewith, a first output shaft, a first larger gear and a first smaller gear loosely supported on said first output shaft, a second output shaft, a second larger and a second smaller gear loosely mounted on said second output shaft respectively in mesh with said first smaller and first larger gears on said first output shaft, said pinion gears being respectively in mesh with said first and second larger gear, a third output shaft with a third smaller gear and a third larger gear loosely mounted and respectively in mesh with said first larger and smaller gears, a fourth output shaft with a fourth smaller gear and a fourth larger gear loosely mounted thereon and respectively in mesh with said second larger and said second smaller gears, clutch means for each of the gears on said output shafts for respectively engaging the latter gears in driving relation with the corresponding output shaft, said smaller and larger gears on each output shaft being driven in opposite directions thereby enabling each of said output shafts to be driven in opposite directions by selective engagement of the respective clutch means, said smaller and larger gears on each output shaft causing such shaft to rotate at different preestablished speeds, said output shafts being coupled respectively to said jib winch, said hoisting winch, said rotatable platform, and said wheels, the higher speed being used for driving said hoisting winch to raise the load and the lower speed being used for driving the hoisting winch to lower the load such that the motive force of the load which is developed as the latter descends causes the speed of the latter to increase to a magnitude substantially equal to that at which the load is raised by said hoisting winch.

2. Hoisting apparatus comprising a vehicle, wheels supporting said vehicle, a platform rotatably mounted on said vehicle a jib having a lower end pivoted on said platform, a jib winch, a hoisting winch having two drums, power means for driving said jib winch, said hoisting winch, said rotatable platform, and said wheels, and gear box means independently connecting said power means to said jib winch, hoisting winch, rotatable platform, and wheels for movement thereof in any of two directions, said gearbox means comprising: an input shaft, a pair of pinion gears of the same size supported on said input shaft for rotation therewith, a first output shaft, a first larger gear and a first smaller gear loosely supported on said first output shaft, a second output shaft, a second larger and a second smaller gear loosely mounted on said second output shaft respectively in mesh with said first smaller and first larger gears on said first output shaft, said pinion gears being respectively in mesh with said first and second larger gear, a third output shaft with a third smaller gear and third larger gear loosely mounted thereon and respectively in mesh with said first larger and smaller gears, a fourth output shaft with a fourth smaller gear and a fourth larger gear loosely mounted thereon and respectively in mesh with said second larger and said second smaller gears, a fifth output shaft with a fifth smaller gear and a fifth larger gear loosely mounted thereon and respectively in mesh with said third larger and said third smaller gears, clutch means for each of the gears on said output shafts for respectively engaging the latter gears in driving relation with the corresponding output shaft, said smaller and larger gears on each output shaft being driven in opposite directions, thereby enabling each of said output shafts to be driven in opposite directions by selective engagement of the respective clutch means, said smaller and larger gears on each output shaft causing such shaft to rotate at different preestablished speeds, said output shafts being coupled respectively to said jib winch, said two drums of said hoisting winch, said rotatable platform, and said wheels, respectively, the higher speed being used for driving said hoisting winch drums to raise the load and the lower speed being used for driving the hoisting winch drums to lower the load such that the motive force of the load which is developed as the latter descends causes the speed of the latter to increase to a magnitude substantially equal to that at which the load is raised by said hoisting winch drums.

References Cited by the Examiner
UNITED STATES PATENTS

| | | | |
|---|---|---|---|
| 780,733 | 1/1905 | Smith | 254—187 |
| 1,886,032 | 11/1932 | Lotte | 254—187 X |
| 1,980,297 | 11/1934 | Scott | 212—38 |
| 2,380,626 | 7/1945 | Zeilman | 212—38 |
| 3,017,941 | 1/1962 | Baker | 74—665 |

FOREIGN PATENTS 810,329   3/1959   Great Britain.

DAVID J. WILLIAMOWSKY, *Primary Examiner.*

J. R. BENEFIEL, *Assistant Examiner.*